J. R. OISHEI.
WINDSHIELD AND THE LIKE.
APPLICATION FILED FEB. 16, 1920.

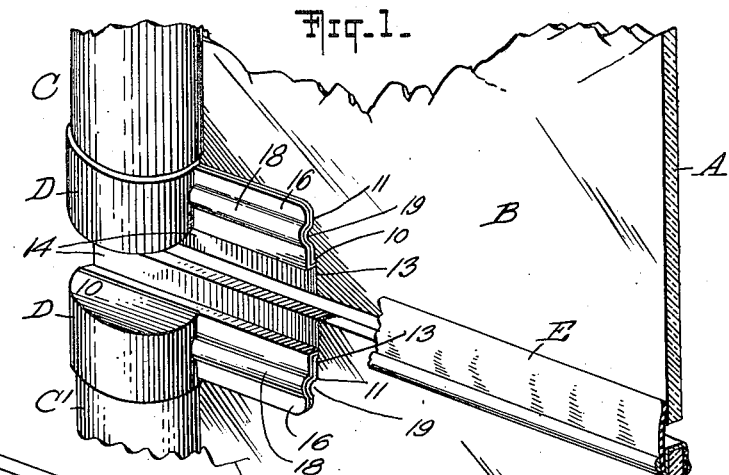
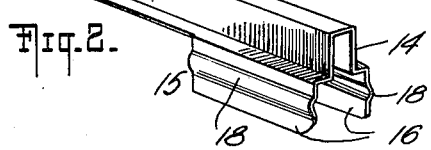
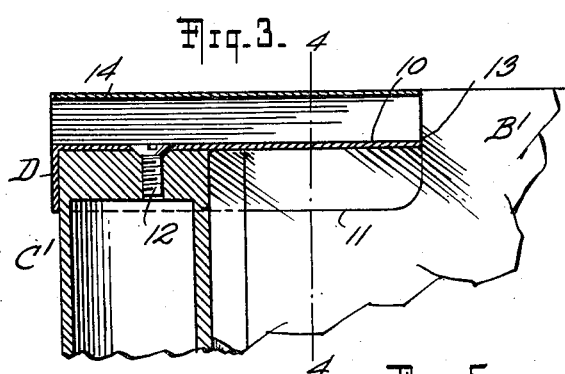
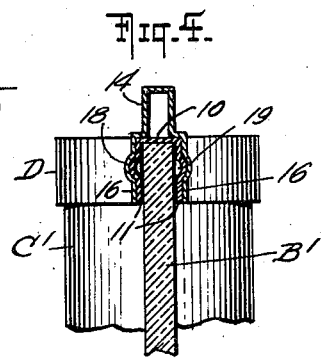
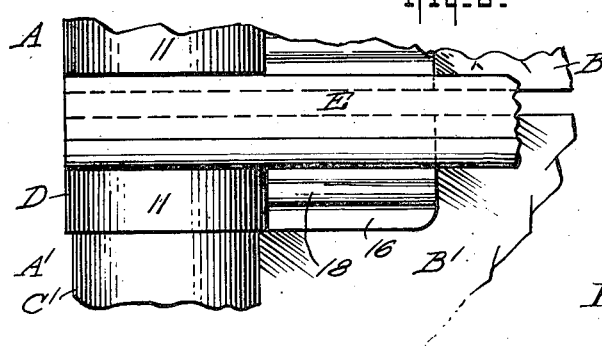

1,407,164.

Patented Feb. 21, 1922.

Inventor
John R. Oishei,
By Parker & Rochwars
Attorneys

J. R. OISHEI.
WINDSHIELD AND THE LIKE.
APPLICATION FILED FEB. 16, 1920.

1,407,164.

Patented Feb. 21, 1922.
3 SHEETS—SHEET 3.

Inventor
By John R. Oishei,
Parker & Brachmer
Attorneys

UNITED STATES PATENT OFFICE.

JOHN R. OISHEI, OF BUFFALO, NEW YORK.

WINDSHIELD AND THE LIKE.

1,407,164. Specification of Letters Patent. Patented Feb. 21, 1922.

Application filed February 16, 1920. Serial No. 358,992.

*To all whom it may concern:*

Be it known that I, JOHN R. OISHEI, a citizen of the United States, residing at Buffalo, in the county of Erie and State of New York, have invented a new and useful Improvement in Windshields and the like, of which the following is a specification.

This invention relates more particularly to improvements in vehicle windshields of the sort used on automobiles. Automobile windshields are ordinarily composed of sections or parts adapted to stand in the same plane and one or both of which is or are adapted to swing to different positions for closing or opening the front of the vehicle. A crack or narrow space is left between adjacent edges of the two sections of such windshields, and it is usual to employ a suitable weather-strip which fits on the edge of the glass of one of the windshield sections and extends across the crack into contact with the other section of the windshield for the purpose of closing the crack, but on account of the usual construction of the frames for the glasses, this weather-strip cannot extend out to the extreme end edges of the windshield and, therefore, leaves the end portions of the crack open. As ordinarily constructed, the frame for the glass or transparent pane of each section extends along the opposite ends of one horizontal edge of the glass. The glass is inserted edgewise between the opposite end bars of the frame into the holding grooves of the frame and is retained in the frame by corner fittings or caps which are secured to the ends of the end frame bars and project inwardly therefrom over the unframed edge of the glass. This leaves the adjacent edges of the glasses of the two windshield sections unframed except at the ends of the sections. The weather-strips, being ordinarily of uniform shape and dimensions throughout, adapted to fit on the unframed edge of one of the glasses, are not adapted to extend out over the caps or corner fittings and must therefore terminate at the inner ends of the opposite corner caps or fittings, thus leaving the end portions of the crack between adjacent corner caps open, as above stated.

One object of this invention is to provide a windshield frame of a construction which adapts the weather-strip to completely close the crack between the sections or parts of the windshield from end to end thereof or across the entire width of the windshield so as not to leave open spaces between the frame parts at the ends of the windshield.

Another object of the invention is to provide a windshield frame in which the corner fittings or caps for retaining the transparent panes or glasses in the frames are constructed so as to form end continuations of the unframed edges of the glasses, and thus enable the weather-strip to embrace or fit over the corner caps or fittings as well as on the glasses and extend from end to end of the windshield to completely close the crack.

Another object of the invention is to improve the construction of windshields and the like in the other respects hereinafter described and set forth in the claims.

In the accompanying drawings:

Fig. 1 is a fragmentary perspective view of a windshield, of one construction embodying the invention.

Fig. 2 is a perspective view, detached, of the movable member of one of the corner caps.

Fig. 3 is a fragmentary elevation, partly in section of the windshield.

Fig. 4 is a transverse sectional elevation thereof on line 4—4, Fig. 3.

Fig. 5 is an elevation of adjacent corner portions of the two sections of the windshield and a weatherstrip therefor.

Figure 6:
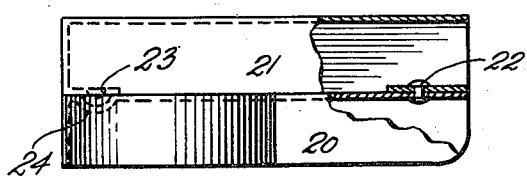
Figs. 6 and 7 are respectively a side elevation, partly in section, and an end elevation of a corner cap of modified construction.

In Fig. 1 of the drawings is shown a portion of a sectional windshield comprising an upper section A and a lower section A'. The upper section A includes, as usual, a transparent pane or glass B and a frame which bounds or embraces the upper, horizontal edge and opposite, end edges of the glass. A portion of one of the end bars of this frame is shown at C. The lower section A′ is of similar construction including a pane of glass B′ and a frame which extends around the lower horizontal edge and opposite end edges of the glass. A portion of one of the end bars of this frame is shown at C′. Each frame, as usual, is provided with channels or grooves to receive and hold the edges of the glass, and the glass is adapted to be inserted edgewise into its frame between the two end bars thereof. The glass is retained in the frame by corner fittings or caps D which are secured to the ends of the end bars of the frame and project therefrom inwardly, or towards each other, and engage or embrace the unframed edge of the glass so as to hold the glass in its frame. Both sections of the windshield shown in Fig. 1 are of a similar construction and provided with like corner caps or fittings, which in the upper section are located at its lower corners, and in the lower section are at the upper corners thereof. Except for the construction of the corner caps or corner portions of the windshield sections or parts, the frame can be of any usual or suitable construction. The corner caps or corner portions of the frame can be of various different constructions within the scope of this invention. Several different constructions embodying the invention are shown in the drawings.

In the construction shown in Figs. 1–5, the corner caps or fittings are detachable from the end bars and each comprises a body of substantially U-shape cross section having a horizontal top plate 10 and vertical flanges 11 which depend from the top plate and extend around the outer end and along the two opposite sides of the cap. The outer end portion of the cap or fitting is shaped to slip over and fit on the end of the end bar C′ of the frame and the inner portion of the cap or fitting is contracted or of less width, adapted to embrace the upper, unframed edge of the glass B′. The cap is secured to the bar C′ by a screw or fastening 12, passing through a hole in the top plate. The end bar of the frame is made shorter than the height of the glass and the glass is notched or cut away at the corners as best shown at 13, Fig. 3, so that the reduced end portions of the glass are preferably substantially equal in height to the end bars of the frame. The bodies of the corner caps embrace these reduced end parts of the glass, and are located below the upper edge of the glass, or in other words, the glass extends upwardly between the two corner caps or fittings at opposite ends of the windshield above the top plate 10 of the body of the cap or fitting. The cap or fitting is provided with a contracted part or member which projects above the glass-engaging portion of the cap to the upper edge of the glass, and is preferably of the same external thickness as the glass, so that this part 14 forms substantially an end continuation of the upper edge of the glass, the top edge and side faces of this part 14 being flush with the top edge and side faces of the glass.

In the construction shown in Figs. 1–5, this contracted member 14 of the cap or fitting is formed by a separate channel-shaped piece of sheet metal 15 which is shown detached in Fig. 2. This piece is adapted to rest upon and extend lengthwise on the top plate 10 of the cap body and is provided at its inner portion with legs or flanges 16 which are adapted to straddle the contracted inner portion of the body of the cap. As shown, the flanges 16 of this member are provided with longitudinal grooves 18 adapted to spring over longitudinal tongues or ribs 19 on the body flanges of the cap to hold the member 14 in place thereon. The member 14 is adapted to be slipped downwardly onto the body of the cap and is prevented from endwise movement between the enlarged outer end portion of the body of the cap and the end of the upwardly projecting edge of the glass B′. The interfitting tongues and grooves prevent the accidental disengagement of the member 14, but enable the same to be removed when necessary to afford access to the screw for removing the end cap. The contracted part or member 14 being of the same width and height as the portion of the glass projecting above the body of the caps, forms substantially a continuation of the edge of the glass out to the end of the cap. A weather-strip E, which fits on or embraces the upper edge of the lower glass of the windshield can, therefore, extend out over the contracted part or member 14 of the corner cap or fitting to the extreme outer edge of the end bar of the windshield frame just as if the glass itself extended out to this point. Fig. 5 shows the weather-strip thus extending out to the extreme end of the frame. The weather-strip may be of any suitable kind or construction adapted to be applied to the edge of the windshield section.

Preferably, the corner caps or fittings for the upper section of the windshield are of the same construction as those on the lower section and are applied to the windshield in the manner explained, but of course, at the lower edge of the glass. The upper section of the windshield as well as the lower therefore, has cap parts or members forming flush continuations of the edge portion of the glass to the outer ends of the frame. The rubber or flexible strip E of the windshield, therefore, bears against a flat or straight face on the upper windshield section extending throughout the width of this section to the extreme ends thereof. The weather-strip is shown as fitting on the lower section, but obviously it could be applied to the upper section and the flexible strip E thereof bear against the lower windshield section. The caps or corner fittings shown in the other Figs. 6–16 inclusive of the drawings likewise have contracted upper parts or members adapted to extend into corner notches in the glass and form substantially flush end continuations of the edge portion of the glass.

Figure 7:
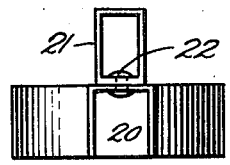

In the construction shown in Figs. 6 and 7, the corner cap or fitting has a lower body portion 20 substantially similar to the body portion of the cap above described and adapted to fit on the end of the end frame bar and over the notched edge of the glass in the same manner. The contracted, upper part or member 21 of this cap, which abuts against the end of the projecting edge part of the glass is pivoted by a rivet 22 or otherwise on the top plate of the cap body so that it is adapted to swing laterally to and from its normal, lengthwise position on top of the cap to afford access to the securing screw or fastening for the cap. The member 21 can be releasably retained in its normal position by any suitable means, such as a projection 23 on the underside of its outer end portion, adapted to snap into a depression 24 in the top plate of the cap body. When in this normal position this upper part 21, like the contracted, upper member before described, extends from and forms a continuation of the upwardly projecting edge portion of the glass.

Figure 8:
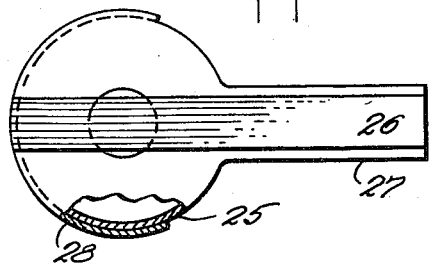
Figs. 8 and 9 are respectively a plan view, partly in section and a side elevation of a second modification of the corner cap.
Figure 9:
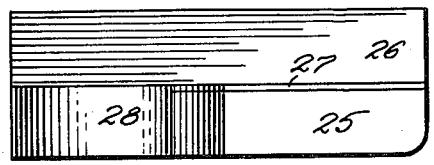

In the construction shown in Figs. 8 and 9, the body 25 of the cap is substantially the same as before described, and is adapted to be secured on the windshield in the same manner. The contracted member 26 of this cap has a bottom plate 27 which rests flat upon the top plate of the cap body 25, and a segmental, cylindrical flange 28, which partially encircles the cylindrical portion of the body of the cap, as shown in Fig. 8. This flange prevents the displacement of the upper member 26 lengthwise off of the body part, but the upper member can be forcibly pulled off to give access to the securing screw for the cap.

Figure 10:
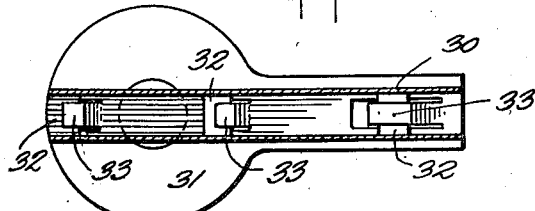
Figs. 10, 11 and 12 are respectively a sectional plan view, an end elevation, and a side elevation, partly in section of a third modification of the corner cap.
Figure 11:
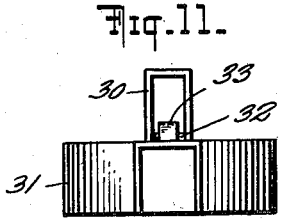
Figure 12:
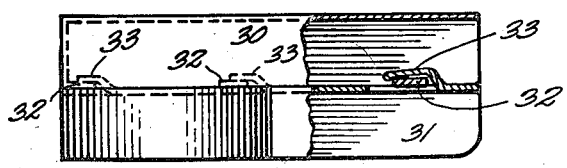

In the construction shown in Figs. 10–12, the contracted upper member 30 of the corner cap or fitting consists of a rectangular, hollow piece, which is slipped endwise into position on the top plate of the body 31 and is releasably retained in position thereon by bottom cross-pieces 32 on the member 30, which extend under tongues struck up from the top plate of the cap body. One of these tongues 33, preferably has a down-bent, free end adapted to snap over the cross piece to releasably retain the upper member in place but permit its forcible removal.

Figure 13:
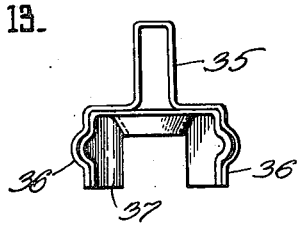
Fig. 13 is an end elevation of a fourth modification.
Figure 14:
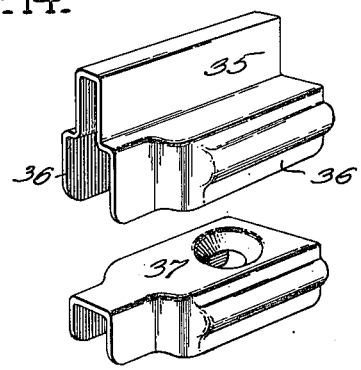
Fig. 14 is a perspective view thereof, showing the two members of the cap separated.

Figs. 13 and 14 show a construction which is substantially similar to the first construction described, except that the removable, upper member 35 has depending, side flanges 36, which extend from end to end thereof and are shaped to conform to the wide and contracted portions of the flanges of the body 37 of the cap. In this construction the tongues and grooves which retain the removable member 35 in place are formed on the wide, outer portions of the cap body flanges 36 instead of on the contracted, inner portions thereof, as in the case of the first construction described.

Figure 15:
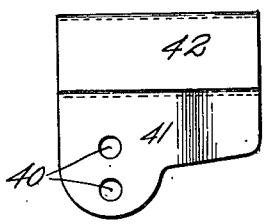
Figs. 15 and 16 are respectively a side elevation and an end elevation of still another form of corner cap.
Figure 16:
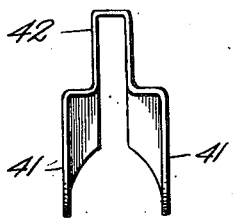

Figs. 15 and 16 show a corner cap or fitting in which the body and contracted, upper member or part are not separate but are formed in one piece. In this construction the cap is adapted to be secured on the end bar of the frame by screws or fastenings passing through holes 40 in its side flanges 41. It is not necessary, therefore, for the contracted, upper member or part 42 which forms the end continuation of the unframed edge of the glass to be separable or movable to afford access to the fastening for the cap, and this contracted member or part can be permanently attached to the lower or body part, and it is preferably formed integrally therewith from a single, bent piece of sheet metal. This construction is less expensive than the other constructions, but is suitable for some of the cheaper makes of windshields which have caps similar in construction to the lower or body portion of the cap shown in Figs. 15 and 16.

I claim as my invention:

1. In a windshield, the combination of a transparent pane, a frame therefor having end bars at opposite ends of said pane, which are shorter than the height of the portion of the pane between said end bars whereby one edge of the pane projects beyond the ends of the end bars, and contracted frame parts extending across the ends of said end bars in line with the projecting edge portion of the pane and forming end continuations thereof at the ends of the end bars of substantially the same transverse width as the thickness of said pane.

2. In a windshield, the combination of a frame, and a transparent pane mounted in said frame and having an unframed edge, said frame having members at opposite corners thereof which form substantially flush end continuations of said edge of the pane, whereby a weather-strip embracing said edge of the pane can extend over said members to the outer edges of the windshield frame.

3. In a windshield, the combination of a frame, a transparent pane mounted in said frame and having an unframed edge, and corner fittings on said frame engaging said pane at opposite corners thereof, said fittings having parts the edges and opposite sides of which form substantially flush end continuations of the edge and the opposite faces of the corner portions of the pane, whereby a weather-strip embracing said edge of the pane can extend over said fittings to the outer edges of the windshield frame.

4. A corner fitting for retaining transparent panes in their frames, said fitting being adapted to be secured to the frame and having a retaining part shaped to engage the pane and a contracted part of a width equal to the thickness of said pane and arranged to extend the full length of said fitting to form a uniform end continuation of one edge portion of the pane.

5. In a windshield, the combination of a pane having opposite end bars, a transparent pane mounted in said frame and having an unframed edge with a portion between said end bars projecting outwardly beyond the ends of said end bars, and corner fittings secured to said end bars and engaging the pane to retain it in the frame, said corner fittings having parts which form substantially flush end continuations of said projecting edge portion of the pane of the same transverse width as the thickness of said edge of the pane to the outer edges of said corner fittings.

6. In a windshield, the combination of a frame having opposite end bars, a transparent pane mounted in said frame and having corner notches at opposite ends of the pane whereby the edge of said pane between said notches projects beyond the ends of said end bars, and corner fittings secured to said end bars and engaging the pane to retain it in the frame, said corner fittings having members occupying said notches and forming end continuations of said projecting edge of the pane, said members being movable to give access to the securing means for the corner fittings.

7. In a windshield, the combination of a frame having opposite end bars, a transparent pane mounted in said frame and having an unframed edge with portion between said end bars projecting outwardly beyond the ends of said end bars, and corner fittings secured to said end bars and having parts which engage the pane to retain it in the frame, and contracted end parts which extend in line with and form substantially flush end continuations of said projecting edge portions of the pane of the same transverse width as the thickness of said edge portions and extending to the outer edges of said frame bars.

8. A corner fitting for retaining transparent panes in their frames, said fitting being constructed to be secured to the frame and having a retaining part to engage the pane, and a contracted part arranged to extend in line with and form an end continuation of one edge portion of the pane to the outer edge of said fitting.

9. A corner fitting for retaining transparent panes in their frames, said fitting being constructed to be secured to the frame and having a retaining part to engage the pane, and a movable part adapted to be mounted on said retaining part and arranged to extend in line with and form an end continuation of one edge portion of the pane to the outer edge of said fitting.

10. A corner fitting for retaining transparent panes in their frames, said fitting being constructed to be secured to the frame and having a flanged retaining part adapted to embrace the pane, and a contracted part arranged to extend in line with and form an end continuation of one edge portion of the pane to the outer edge of said fitting, said contracted part being of substantially the same thickness as said edge portion of the pane.

Witness my hand this 13th day of February, 1920.

JOHN R. OISHEI.

Witnesses:
CHARLES TESCHNER,
VALENTINE W. GRADY.